March 28, 1950

B. DEL CARLO 2,502,209

MACHINE FOR SIZING, CLEANING, AND CUTTING ASPARAGUS TIPS

Filed Feb. 18, 1946

INVENTOR.
BARTOLOMEO DEL CARLO
BY
Thomas Astberg
ATTORNEY

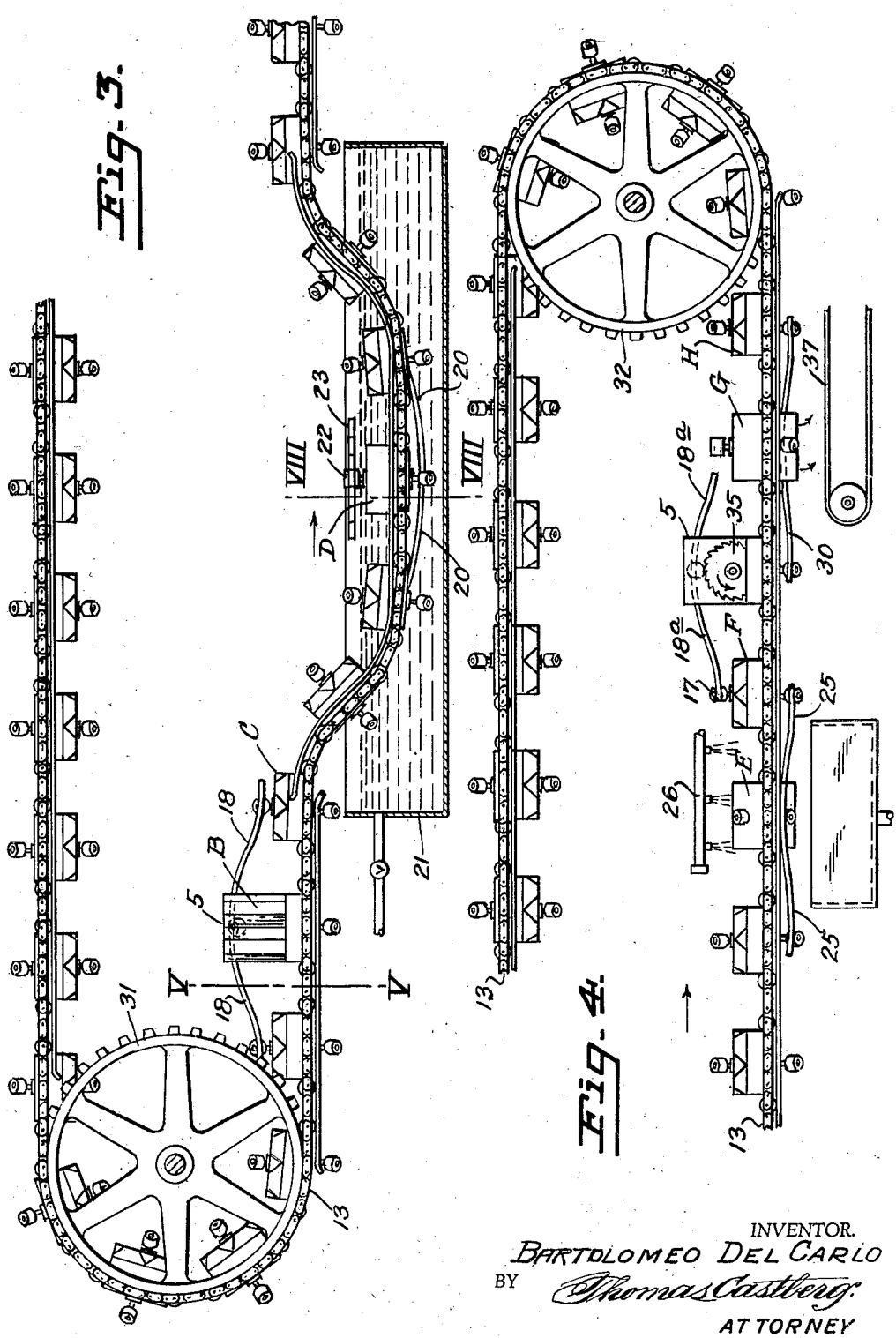

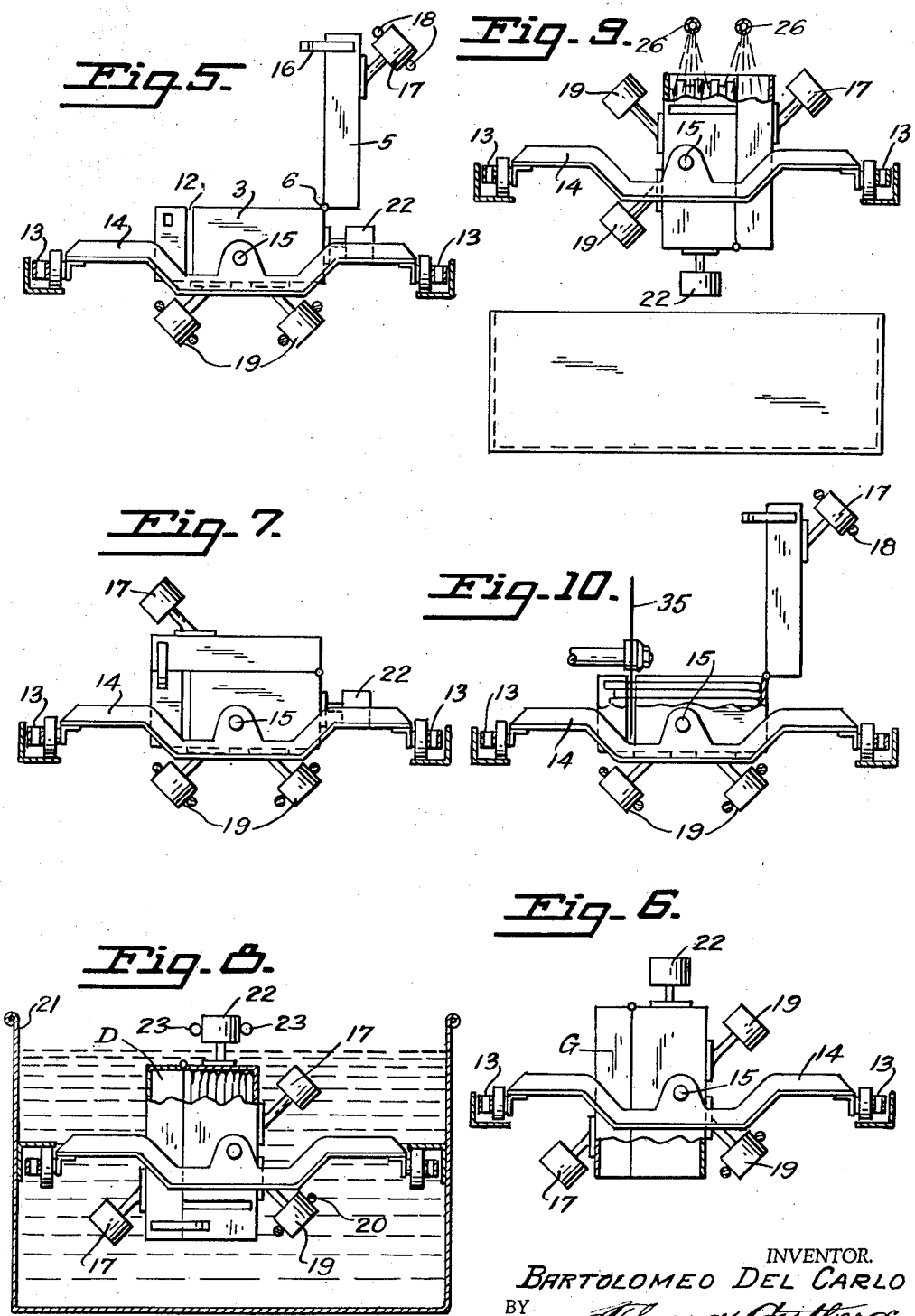

Patented Mar. 28, 1950

2,502,209

UNITED STATES PATENT OFFICE 2,502,209

MACHINE FOR SIZING, CLEANING, AND CUTTING ASPARAGUS TIPS

Bartolomeo Del Carlo, Stockton, Calif.

Application February 18, 1946, Serial No. 648,376

8 Claims. (Cl. 146—82)

This invention relates to a machine for positioning, sizing and cleaning asparagus.

Asparagus stalks when cut and harvested in the fields are of varying length and in this condition are brought into the packing plants where they are washed and cut to a specified length, then packed in crates to be shipped to the market, or they are delivered directly to canneries for cooking and canning. The tip portion of the asparagus is the tender and edible portion and varies in length from four to six inches or more. The remaining or butt portion of the asparagus is usually tough or stringy and is the part to be cut or removed. The method used in packing plants is to place the asparagus in bunches on a flat belt with the tip ends against a gage board which determines the length. They are then cut off by a saw. The length which results depends upon how well the operators place the tips in position. Inasmuch as the asparagus stalks are handled in bunches, only a few of them are cut off to the maximum allowed length. In other words when the foremost tips of a bunch of asparagus touch the gage board, the bunch is dropped and most of the asparagus stalks are cut shorter than their useable length. Some packers hire operators to stand at the belt and push the asparagus against the gage board. However, due to the large amount of asparagus which passes the operator, only a few of the misplaced stalks are detected and positioned for cutting and the waste is accordingly very considerable.

Another method used by some packers is to place the asparagus in shipping crates leaving the bottom of the crates open. The projecting butt ends are then cut off using the bottom edge as a guide. A large knife to hand cut the crate full of asparagus is employed, and after the butt ends have been cut off, the bottom is nailed on. This method also has great waste as the packer is paid by the amount of crates he or she packs and is interested in filling the crates rather than placing the asparagus carefully in the crates. The contents of the crates are finally sold by the pound and the cost rises due to the small tonnage sold per acre. The fact that all the packers use the same method maintains the market competitive and the waste is passed on to the consumer by an increase in price.

The object of the present invention is to eliminate waste or throwing away of that edible portion of asparagus which is cut off when the asparagus is cut too short; and furthermore to obtain asparagus of a substantially uniform length; to provide a machine which is simple in construction and operation; to provide a machine in which bunches of asparagus are placed in separate containers carried by an endless conveyor, said containers during their travel from a loading to a discharge point and after loading, first, being submerged in water or a like liquid to subject the asparagus to flotation so as to cause the individual asparagus stalks in each bunch to float or raise to a point in each container where the tip ends will engage a gage plate, second, being subjected to agitation for washing the asparagus while submerged, third, being reversed; after the flotation operation so that the tip ends of the asparagus will point downwardly, fourth, being subjected to a spray washing action effective upon the contained asparagus, and fifth, being passed by a saw where the butt ends of the asparagus are cut off; and further, to provide a machine which is capable of continuous operation, large output, and in which the asparagus stalks are not only automatically positioned by flotation but also sized, cut and cleaned before being discharged from the machine.

The machine is shown by way of illustration in the accompanying drawings in which:

Fig. 3 is a diagrammatic side elevation of the front or feeding portion of the machine;

Fig. 4 is a diagrammatic side elevation forming a continuation of Fig. 3 and showing the rear or discharge portion of the machine;

Fig. 5 is a cross section of the conveyor and one of the containers carried thereby, said section being taken on line V—V of Fig. 3 and showing the cover of the container in open position;

Fig. 6 is a similar cross section showing the container in inverted or discharge position in the discharge portion of the conveyor;

Fig. 7 is a similar cross section showing the cover of the container in closed position;

Fig. 8 is a cross section of the conveyor in the submerged portion thereof taken on line VIII—VIII of Fig. 3, said section showing a portion of the container broken away;

Fig. 9 is a similar cross section of the conveyor in the spray portion thereof, part of the container being broken away;

Fig. 10 is a similar cross section of the conveyor showing the container with the asparagus positioned therein passing through the cut off saw.

Figure 1:
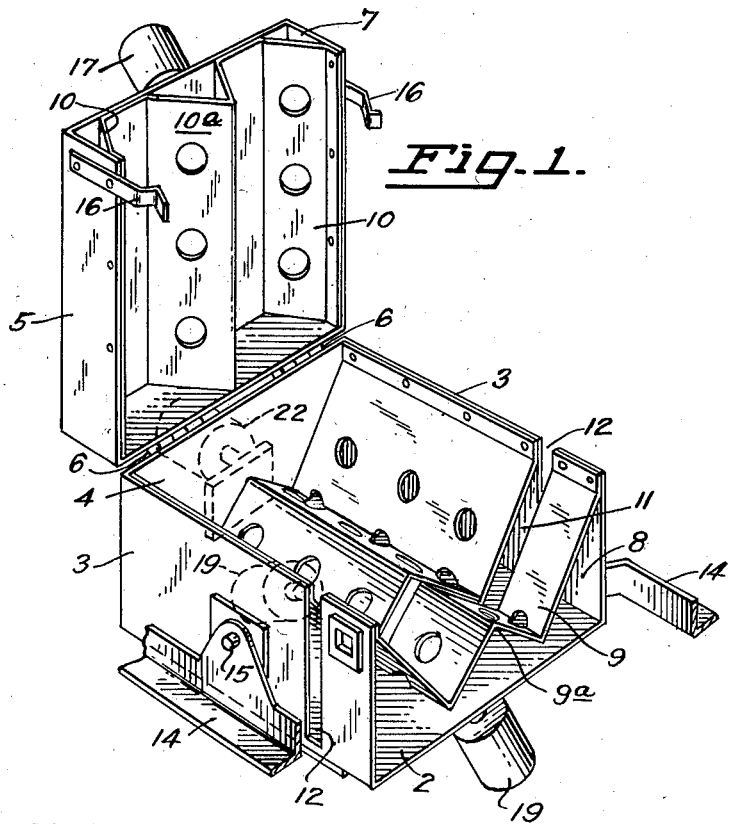
Fig. 1 is a perspective view of one of the containers provided for the reception of asparagus.

Referring to the drawings in detail, and particularly Fig. 1, A indicates in general a container which is provided for the purpose of receiving, holding and positioning a bunch of asparagus stalks so that they may be passed through a saw and cut off to uniform length. The container comprises a bottom portion 2, a pair of side sections 3—3 and an end section 4 which will hereinafter be referred to as a gage plate, and in addition thereto the container is provided with a cover section 5 which is secured to the end or gage plate 4 by means of hinges 6. One end of the cover is open as indicated at 7 and so is the adjacent end 8 of the container. A false bottom section 9 is secured within the container and spaced therefrom and a false cover 10 is secured within the cover 5. Both the false bottom and false cover section are substantially W-shaped in cross section, and in addition thereto the false bottom section has a cross slot 11 formed therein and aligned slots 12 are formed in the sides of the container to provide a passage for a circular saw as will hereinafter be described.

Figure 2:
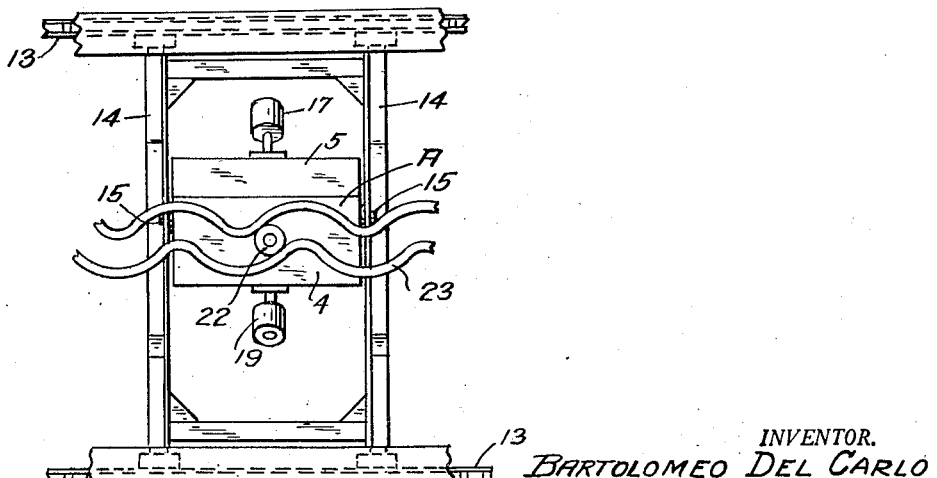
Fig. 2 is a plan view of a portion of the conveyor showing a container carried thereby in upright or vertical position in the transverse rocking mechanism.

In actual practice a considerable number of containers of the type shown in Fig. 1 are employed and they are supported and spaced apart on an endless conveyor such as diagrammatically shown in Figs. 3 and 4. The conveyor illustrated in the present instance comprises a pair of sprocket chains 13—13 spaced apart horizontally. These chains carry pairs of cross arms 14—14 (see Fig. 2) and each pair of arms serves as a pivotal support for the container A. The pivots connecting the container and cross arms are shown at 15.

Continuous travel is imparted to the conveyor chains in any suitable manner and during this travel each container will reach a loading position indicated at B (see Fig. 3) where the cover is automatically opened to the position shown in Figs. 1, 3 and 5. The cover of each container is normally held in closed position by a pair of flexible spring latches 16—16 and as each container approaches the loading position B, a roller 17 carried by the cover engages a cam track 18 and the cover is thereby raised to open position. An operator at this point places a bunch of asparagus in the container with the tip ends pointing towards the gage plate 4. As the bunch of asparagus is dropped by the operator into the container, the bunch is for all practical purposes divided into two bunches by the central raised or V-portion 9a of the false bottom section. This is important as it spreads the asparagus over a larger area and it also prevents the asparagus from bunching together during operations hereinafter to be described, the bunching together being prevented by the V-portion 10a of the false cover section as this substantially meets the apex of the V-portion 9a when the cover is closed. No attempt is made by the operator carefully to position the asparagus as that will be automatically accomplished as will hereinafter be described.

The container is loaded while it is travelling. The cam track 18 closes the cover after loading and the cover is fully closed and secured by the latches when the position C is reached (see Fig. 3). The previously horizontal container inclines and enters a tank indicated at 21 which is substantially filled with water. As the container reaches a submerged condition in the water and resumes its horizontal position, rollers 19—19 on the container engage cam tracks 20. These tracks curve and thereby impart a turning movement to the container A which swings it about its pivots 15 until the container reaches a vertical position with its bottom or gage plate 4 uppermost as indicated at D. This position is shown in Figs. 3 and 8. A roller 22 mounted on the end plate 4 of the container at this time engages a wave-formed cam track 23 (see Figs. 3 and 8), and as the container travels through the tank, it is swung from side to side. This motion is not only a swinging motion, but also a jolting motion. It assists washing by agitating the asparagus and at the same time separates the asparagus stalks and thereby permits each individual asparagus stalk to float upwardly until the tip ends engage the gage plate or end plate 4.

As the container continues to travel, the cam track 20 again rotates the container about its pivots 15 until it assumes a horizontal position. In this position it rises upwardly and out of the tank and as it continues to travel, the rollers 19 engage cam tracks 25 (see Fig. 4) which now rotate the container about its pivots 15 until it reaches the vertical position indicated at E with the open end uppermost. A series of spray nozzles 26 are mounted above the conveyor at this point and these project a spray of water downwardly through the container and thereby further wash and finally rinse the asparagus. The cam tracks 25 again swing the container about its pivots 15 to a horizontal position shown at F (see Fig. 4) and in this position roller 17 on the cover engages a cam track 18a and the cover is opened. A saw or circular cutter 35 of any suitable character, and power driven, is disposed above the conveyor. The saw aligns with the slots 11 and 12 formed in the container. Hence, as the container travels, the saw passes through the slots and the butt ends are sawed off bringing the asparagus stalks to a uniform length.

As the container moves away from the saw, the cam track 18a closes the cover, and while the cover is being closed, the rollers 19 engage the cam track 30 and the container is again swung to a vertical position indicated at G with the open end lowermost (see Figs. 4 and 6), thus permitting the sized, cut and cleaned asparagus to be discharged by gravity. The discharged asparagus is either delivered to a conveyor indicated at 37 or is dumped into crates or boxes, or handled in any other suitable manner. The cam track 30 returns the container, after it has been discharged, to the horizontal position shown at H (see Fig. 4) and it travels in this position until it reaches the loading position indicated at B in Fig. 3 where the cover is again opened by the cam track 18 and the cycle of operation repeated.

Sprocket gears 31 and 32 are shown at opposite ends of the conveyor and power may be transmitted to either one to impart continuous movement to the conveyor, and while this and other features of the invention have been more or less specifically described and illustrated, it should be understood that changes may be resorted to within the scope of the appended claims.

Having thus described my invention, what I claim and desire to secure by Letters Patent is:

1. In a machine of the character described, an endless continuously moving conveyor, a plurality of open ended containers spaced apart and pivotally mounted on the conveyor, each container having a hinged cover and provided with a closed end to form a gauge and pivotally mounted on the conveyor for movement to and from horizontal and vertical positions and initially arranged horizontally in a loading position to receive asparagus with the tips pointing toward the gauge, means for opening the covers at said loading position and for closing the covers of the containers leaving said position, a tank containing flotation liquid, means for directing the conveyor together with the containers downwardly into the tank to submerge the containers, means in the path of the containers for swinging the same about their pivots to a vertical position with gauges at the top and the tips of the asparagus pointing upwardly for causing the asparagus to float with their tips abutting said gauges, means in the path of the containers for turning the same from a vertical position to a horizontal position while submerged for removal from the tank in said horizontal position, and cutting mechanism arranged for trimming the butts of the asparagus so that they will all be of the same length.

2. In a machine of the character described, an endless continuously moving conveyor, a plurality of open ended containers spaced apart and pivotally mounted on the conveyor, each container having a hinged cover and provided with a closed end to form a gauge and pivotally mounted on the conveyor for movement to and from horizontal and vertical positions and initially arranged horizontally in a loading position to receive asparagus with the tips pointing toward the gauge, means for opening the covers at said loading position and for closing the covers of the containers leaving said position, a tank containing flotation liquid, means for directing the conveyor together with the containers downwardly into the tank to submerge the containers, means for swinging the containers about their pivots to assume a vertical position with the gauges at the top and the tips of the asparagus pointing upwardly and for also jolting the containers to separate the asparagus and cause the same to float individually into engagement with the gauges, means in the path of the containers for turning the same from a vertical position to a horizontal position while submerged for removal from the tank in said horizontal position, and cutting mechanism arranged for trimming the butts of the asparagus so that they will all be of the same length.

3. In a machine of the character described, an endless continuously moving conveyor, a plurality of open ended containers spaced apart and pivotally mounted on the conveyor, each container having a hinged cover and provided with a closed end to form a gauge and pivotally mounted on the conveyor for movement to and from horizontal and vertical positions and initially arranged horizontally in a loading position to receive asparagus with the tips pointing toward the gauge, means for opening the covers at said loading position and for closing the covers of the containers leaving said position, a tank containing flotation liquid, means for directing the conveyor together with the containers downwardly into the tank to submerge the containers, means in the path of the containers for swinging the same about their pivots to a vertical position with the gauges at the top and the tips of the asparagus pointing upwardly for causing the asparagus to float with their tips abutting said gauges, means in the path of the containers for turning the same from a vertical position to a horizontal position while submerged for removal from the tank in said horizontal position, means in the path of the containers for opening the covers, spraying means arranged to spray the asparagus while the covers are open, and means arranged to trim the butt ends of the asparagus so that they will all be of uniform length.

4. In a machine of the character described, a container having an end wall forming a gauge, said container being initially arranged in a horizontal position to receive asparagus with the tips pointing in the direction of said gauge, a tank containing a flotation liquid, a conveyor for advancing the container in a path extending into and out of said tank and submerging said container in the liquid of the tank, means located in the path of advance of the submerged container for turning the same as it advances from a horizontal position to an upright position with the gauge at the top for causing the asparagus to float and rise so that the tip ends will engage the gauge, means arranged in the path of advance of the turned and submerged container to engage and rotate the container from said upright position to a horizontal position for removal from the tank, and cutting means arranged in the path of said container out of said tank for trimming the butt ends of the asparagus so that all will have a uniform length.

5. In a machine of the character described, a container having an end wall forming a gauge, said container being initially arranged in a horizontal position to receive asparagus with the tips pointing in the direction of said gauge, a tank containing a flotation liquid, a conveyor for advancing the container in a path extending into and out of said tank and submerging said container in the liquid of the tank, means located in the path of advance of the submerged container for turning the same as it advances from a horizontal position to a vertical position, means in said path of advance for jolting the turned and submerged container to separate the asparagus and wash the same and assist the asparagus to float individually so that the tip ends will engage the gauge, means arranged in said path of advance to engage and rotate the container from said vertical position to a horizontal position for removal from the tank, and cutting means arranged in said path out of said tank for trimming the butt ends of the asparagus so that all will have a uniform length.

6. In a machine of the character described, a container open at one end and having a gauge at the other end and initially arranged in a horizontal position to receive asparagus with the tips pointing towards the gauge, a tank containing a flotation liquid, a conveyor for advancing the container in a path extending into and out of said tank and submerging the container in the tank, means located in the path of advance of the submerged container for turning the same as it advances from a horizontal position to an upright position with the gauge at the top and the open end at the bottom for causing the asparagus to float with the tips abutting the gauge, means in the path of advance of the submerged container for returning the same to a horizontal position prior to removal of the container from the tank by further advance in said path, and cutting mechanism arranged in said path out of said tank for trimming the butt ends of the asparagus so that all will have a uniform length.

7. In a method of sizing, washing and cutting asparagus to uniform length, the steps of immersing a bunch of asparagus in a flotation liquid with the stalks horizontal, then turning the immersed asparagus while still in bunch arrangement so that the tip ends of the asparagus point upwardly, then leaving the submerged and turned asparagus free to float upwardly in the liquid until the tips rise to a predetermined level, then turning the submerged asparagus into a horizontal position while maintaining the relative position of the tips, then removing the horizontally turned asparagus from said liquid while maintaining the relative position of the tips, and then trimming the butt ends of the asparagus while maintaining the relative position of the tips so that they will all be of uniform length.

8. In a method of sizing, washing and cutting asparagus to uniform length, the steps of immersing a bunch of asparagus in a flotation liquid with the stalks horizontal, then turning the immersed asparagus while still in bunch arrangement so that the tip ends of the asparagus point upwardly, then leaving the submerged and turned asparagus free to float upwardly in the liquid until the tips rise to a predetermined level, jolting the submerged and upwardly floating asparagus, then turning the submerged asparagus into a horizontal position while maintaining the relative position of the tips, then removing the horizontally turned asparagus from said liquid while maintaining the relative position of the tips, and then trimming the butt ends of the asparagus while maintaining the relative position of the tips so that they will all be of uniform length.

BARTOLOMEO DEL CARLO.

REFERENCES CITED

The following references are of record in the file of this patent:

UNITED STATES PATENTS

| Number | Name | Date |
|---|---|---|
| 1,091,787 | Adams | Mar. 31, 1914 |
| 1,448,532 | Harding | Mar. 13, 1923 |
| 1,454,555 | Nielsen | May 8, 1923 |
| 1,866,027 | Gill | July 5, 1932 |
| 2,310,358 | Emmons et al. | Feb. 9, 1943 |